United States Patent
Ferguson et al.

(10) Patent No.: US 12,393,458 B1
(45) Date of Patent: Aug. 19, 2025

(54) DYNAMICALLY COMPOSABLE DATA-IN-PLACE SYSTEM

(71) Applicant: VDURA, Inc., San Jose, CA (US)

(72) Inventors: David Ferguson, Berthoud, CO (US);
Ian Davies, Longmont, CO (US);
Michael Barrell, Longmont, CO (US);
Pete Maddocks, Denver, CO (US)

(73) Assignee: VDURA, Inc., San Jose, CA (US)

( * ) Notice: Subject to any disclaimer, the term of this patent is extended or adjusted under 35 U.S.C. 154(b) by 0 days.

(21) Appl. No.: 19/048,513

(22) Filed: Feb. 7, 2025

(51) Int. Cl.
*G06F 9/50* (2006.01)

(52) U.S. Cl.
CPC .................. *G06F 9/5016* (2013.01)

(58) Field of Classification Search
CPC ........................................................... G06F 9/50
See application file for complete search history.

(56) References Cited

U.S. PATENT DOCUMENTS

| 8,489,720 B1* | 7/2013 | Morford .............. H04L 12/145 709/225 |
| 2024/0427645 A1* | 12/2024 | Darji ................... G06F 11/3034 |

\* cited by examiner

*Primary Examiner* — Charlie Sun
(74) *Attorney, Agent, or Firm* — Fenwick & West LLP

(57) ABSTRACT

A system monitors application-level performance metrics associated with a high-performance computing (HPC) application and resource-level performance metrics associated with resources provisioned for the HPC application. The system accesses an HPC deployment map representing placement and interconnection of the resources provisioned for the HPC application, and analyzes the application-level performance metrics, resource-level performance metrics, and the HPC deployment map to determine one or more recommended actions to improve the application-level and resource-level performance metrics. The system then executes at least one of the one or more recommended actions.

20 Claims, 9 Drawing Sheets

DYNAMICALLY COMPOSABLE DATA-IN-PLACE SYSTEM

BACKGROUND

1. Field of the Disclosure

The present disclosure relates to storage systems and more specifically to dynamic resource allocation in a high-performance computing (HPC) storage system.

2. Description of the Related Art

In high performance computing (HPC) systems, resources like storage devices and compute are often provisioned using static provisioning strategies, where resource types are pre-selected and remain fixed unless manually reconfigured. For example, an organization might decide that 20% of its storage should be allocated to high-performance SSDs, while the remaining 80% is allocated to slower, lower-cost HDDs. Once this decision is made, the ratio is typically fixed unless manually changed by an administrator.

Due to the static nature, such HPC systems often over-provision storage devices and compute. Over-provisioning refers to allocating more resources than are typically required by the HPC system. This is done as a precaution to handle unexpected spikes in demand or to avoid performance bottlenecks during peak usage. In many cases, administrators cannot accurately predict how much storage, compute, or input/output (I/O) an application will require at all times. To ensure uninterrupted performance, administrators often err on the side of caution and allocate resources beyond that might realistically be needed. As such, many resources, e.g., high-performance storage devices or compute units, may sit idle for most of their lifecycle, reducing overall system efficiency.

SUMMARY

Embodiments described herein address the problem of over-provisioning by introducing a dynamic, workload-aware system that continuously monitors high performance computing application performance metrics and automatically adjusts resource allocation.

In some embodiments, a cloud-based system monitors application-level performance metrics associated with a high-performance computing (HPC) application, and resource-level performance metrics associated with resource provisioned for the HPC application. The application-level performance metrics may include (but are not limited to) a number of active client sessions, metadata input/output operations per second (IOPS), file IOPS, file bandwidth, and/or file extents. The resource-level performance metrics may include (but are not limited to) processor utilization, storage capacity, and/or network utilization associated with the resources provisioned for the HPC application.

The cloud-based system also accesses an HPC deployment map representing placement and interconnection of the resources provisioned for the HPC application, and analyzes the application-level performance metrics, resource-level performance metrics, and the HPC deployment map to determine one or more recommended actions to improve the application-level performance metrics, resource-level performance metrics. In some embodiments, the one or more recommendations may also be based on cloud provider capabilities, such as resource availability, costs, and geolocations of resources relevant to end-users of the HPC application.

In some embodiments analyzing the application-level performance metrics, resource-level performance metrics, and the HPC deployment map to determine one or more recommended actions include applying a machine learning model trained over historical data associated with the HPC application. The machine learning model is trained to receive application-level performance metrics, resource-level performance metrics, and the HPC deployment map as input and output the one or more recommended actions.

The one or more recommended actions include one or more of modifying a type or quantity of a compute resource, modifying a type or quantity of a storage resource, modifying a network resource, and/or modifying a geolocation of a compute resource or a storage resource.

The cloud-based system executes at least one of the one or more recommended actions. Executing the at least one recommended action includes identifying a first type of storage device with a first data access speed currently in use with the HPC application, selecting a second type of storage device with a second data access speed that differs from the first data access speed based on the monitored performance metrics, and provisioning an amount of the second type of storage device, migrating at least a portion of the data stored on the first type of storage device to the provisioned second type of storage device, and deprovisioning an amount of the first type of storage device on which the portion of the data previously stored that has been migrated to the second type of storage.

In some embodiments, executing the at least one recommended action includes identifying a first type of compute resource (e.g., processor, CPU, GPU) with a first processing speed currently in use within the HPC application, selecting a second type of compute resource with a second processing speed that differs from the first data access speed based on the monitored performance metrics, provisioning an amount of the second type of compute resources, replacing an amount of the first type of compute resource with the amount of the second type of compute resource, and deprovisioning the amount of the first type of compute resource replaced by the second type of compute resource. In some embodiments, executing at least one recommended action includes adjusting a network bandwidth of the HPC application.

BRIEF DESCRIPTION OF THE DRAWINGS

The teachings of the embodiments can be readily understood by considering the following detailed description in conjunction with the accompanying drawings.

Figure 1:
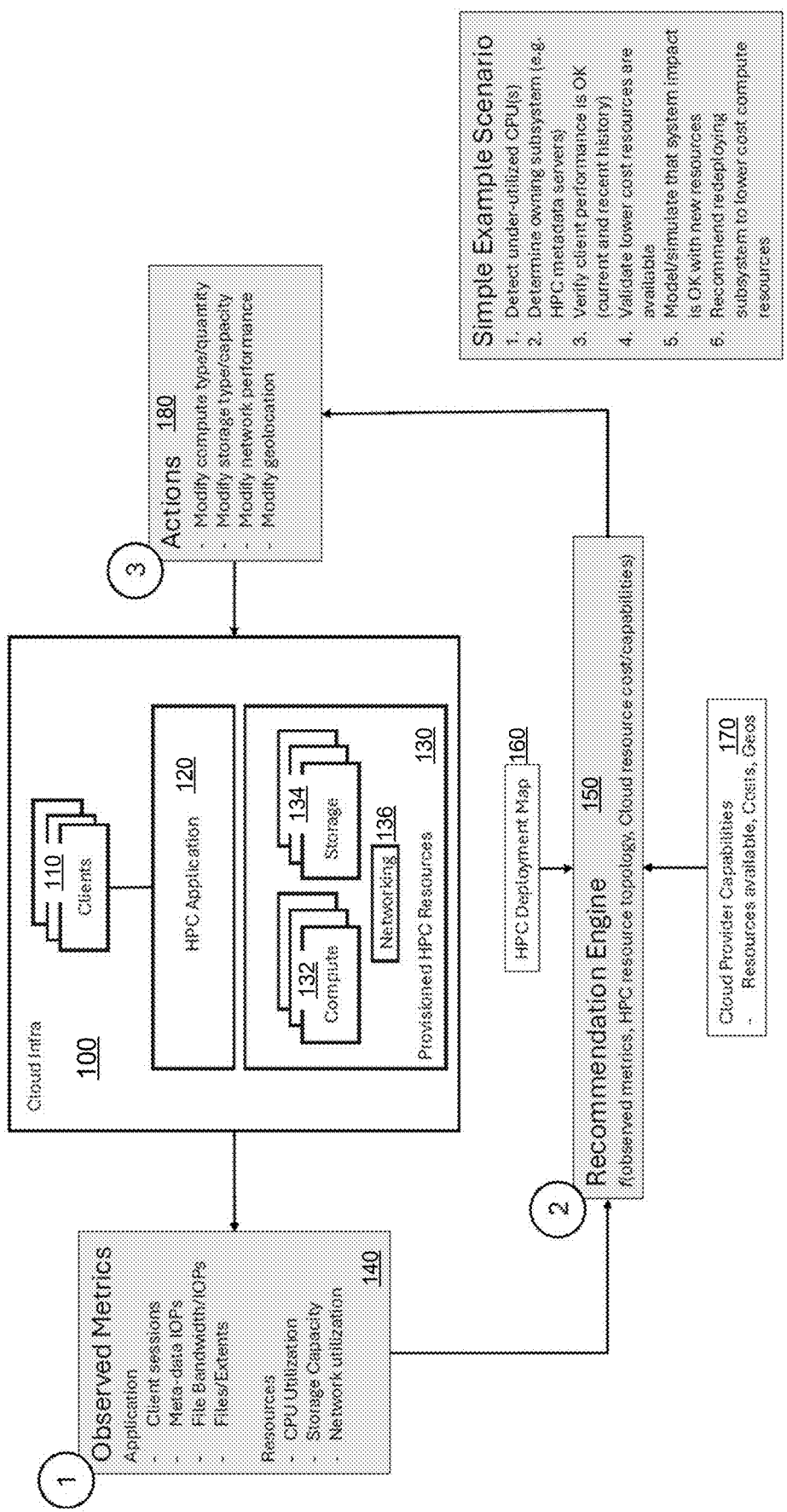
FIG. 1 illustrates an example environment, in which a high-performance computing (HPC) resource management system may be implemented, in accordance with one or more embodiments.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

DETAILED DESCRIPTION

In high performance computing (HPC) applications, resources such as storage devices and compute units are often managed using static provisioning strategies. These strategies may involve pre-selecting resource types and maintaining fixed configurations unless manually adjusted. For example, an organization might allocate 20% of its storage to high performance SSDs, while the remaining 80% is allocated to slower, lower-cost HDDs. Once this allocation is configured, the ratio remains fixed unless an administrator manually reconfigures it.

Administrators often face challenges in accurately predicting the storage, compute, or input/output (I/O) requirements of applications at all time. To ensure consistent performance, they tend to allocate resources beyond what is actually needed (referred to as "overprovisioning"). As a result, many high-performance storage devices and compute units remain idle for much of their lifecycle, reducing the overall efficiency of the system.

The embodiments described herein address the inefficiencies of overprovisioning by introducing a dynamic, workload-aware high-performance computing (HPC) resource management system (also referred to as "the system") that continuously monitors storage system performance metrics and automatically adjusts resource allocation. This approach reduces the reliance on static provisioning and improves system efficiency.

In some embodiments, the system monitors performance metrics of its HPC applications. The performance metrics include application-level metrics and resource-level metrics. Application-level metrics may include (but are not limited to) client sessions, metadata IOPS, file bandwidth, file IOPS, file extents. Resource-level metrics may include (but are not limited to) CPU utilization, storage capacity, network utilization. These metrics enable the system to assess its performance in real time and determine whether the current resource allocation and configuration meet the demands of its HPC applications or whether resources are overprovisioned.

In some embodiments, the system analyze the metrics against one or more predetermined performance criteria to determine one or more recommended actions. The one or more predefined performance criteria may include (but are not limited to) minimum/maximum client sessions, minimum/maximum metadata IOPS, minimum/maximum file transfer speeds, minimum/maximum file IOPS, minimum/maximum file storage across extents, among others. The one or more recommended actions may include (but are not limited to) modifying compute resource type or quantity, modifying storage resource type or capacity, modifying network performance, and/or modifying geolocation of compute resource or storage resource.

In some embodiments, the one or more recommended actions are also based on an HPC deployment map that represents placement and interconnection of the resources provisioned for the HPC application. In some embodiments, the one or more recommended actions are also based on cloud provider capabilities, such as resource availability, costs, and geolocations of resources relevant to end-users of the HPC applications. In some embodiments, the one or more recommended actions are output from a pretrained machine learning model configured to take performance metrics, HPC deployment map, and/or cloud provider capabilities as input.

By automatically adjusting resource allocation, the cloud-based storage system provides an intelligent, self-optimizing solution for managing storage resources and compute resources in HPC applications.

Example High-Performance Computing (HPC) Resource Management System

FIG. 1 illustrates an example environment, in which a high-performance computing (HPC) resource management system 100 (also referred to as "the system") may be implemented, in accordance with one or more embodiments. The system 100 may be part of a cloud infrastructure, including one or more clients 110, one or more HPC application(s) 120, and provisioned HPC resources 130 for the HPC application(s) 120. Clients 110 are associated with end-users or applications that interact with HPC application 120 running in the cloud infrastructure.

An HPC application 120 is software that processes workloads, which may be computationally intensive. The HPC applications 120 may include (but are not limited to) a high performance storage system, a scientific simulation system, a machine learning training system, financial risk analysis system, or any other workload that requiring computational resources. The HPC applications 120 manage and distribute tasks among provisioned HPC resources 130.

The provisioned HPC resources 130 are the cloud-based infrastructure components allocated to run the HPC applications 120. The HPC resources 130 include compute 132, storage 134 and networking 136. Compute 132 includes various types of processors, such as CPUs, GPUs, used for computation. Storage 134 includes various types of storage devices, such as SSD, HDD. Networking 136 includes network resource that support data transfer between compute and storage resources, such as virtual networks, subnets.

The system 100 observes metrics 140 associated with HPC applications 120 and resources 130. The metrics associated with HPC applications 120 include client sessions, metadata input/output operation per second (IOPS), file bandwidth, file IOPS, and file extents.

Client sessions refer to interactions or connections established between a client 110 (e.g., user, application, or client system) and an HPC application 120. A client session typically begins when a client 110 initiates a request (e.g., logging in, submitting a job, or accessing a file) and ends when the interaction is completed, timed out, or terminated. For example, a client 110 may initiates a session by logging into an HPC application 120. The session remains active while the client 110 performs operations, such as submitting computational jobs, accessing storage, or querying a database. The session ends when the client logs out or disconnects, the workload or request is completed, or the system 100 closes the session due to inactivity. Client sessions directly influence the resource utilization of an HPC application 120. Each session represents a user or application running computations, storing data, or transmitting information across the network. A high number of active client sessions can result in increased CPU utilization, memory consumption, and disk activity, potentially causing resource contention if not properly managed.

Metadata IOPS refers to a number of input/output operations per second that involve metadata rather than actual file content in an HPC application 120. Metadata includes information about files, such as file names, access permissions, timestamps, directory structures, and storage locations, which help manage and retrieve data efficiently. Metadata IOPS relates to operations like file creation, deletion, modification, and directory lookups. Since HPC workloads often involve parallel processing across many compute nodes, each node frequently interacts with the file system to read, write, and modify data. High metadata IOPS may occur during management of file indexing, directory traversal, and/or real-time access to massive datasets. For example, an AI model training may generate millions of small metadata operations, which can create bottlenecks if the storage system is not optimized for metadata-heavy workloads.

File bandwidth refers to data transfer rate, such as an amount of data transferred per second, e.g., megabyte or gigabyte per second. Bandwidth IOPS refers to IOPS associated with data transfer in an HPC application, which measures a number of individual read or write operations per second. File bandwidth and bandwidth IOPS reflect the HPC application's ability to process both high-throughput (large, sequential file transfers) and high-frequency (many small, random operations) workloads. For instance, an AI training workloads may require transferring large datasets, demanding high bandwidth, while parallel computing tasks often generate numerous small file operations, requiring high IOPS. A mismatch or bottleneck in either bandwidth or IOPS can significantly impact the performance of HPC applications, causing delays in data access, computation, or job execution.

File extents refer to contiguous blocks of storage allocated to a file on a disk or storage system. Instead of managing individual blocks, a file system may organize data in large units (extents) to improve performance and reduce fragmentation. Each extent specifies a starting block and a number of consecutive blocks it includes. File extends are particularly advantageous in large-scale storage systems, as they reduce overhead by reducing a number of metadata entries required to track file locations, making file operations more efficient. HPC workloads often involve high-throughputs data access, such as sequential reading and writing of massive files, which can benefit significantly from the use of extents. Additionally, in distributed file systems in HPC applications 120, managing file extents helps optimize data placement across nodes, balancing workloads and reducing bottlenecks.

Metrics associated with resources include (but are not limited to) CPU utilization, storage capacity, and network utilization. CPU utilization refers to a percentage of time the CPU is actively executing instructions as opposed to being idle. High CPU utilization indicates the processor is heavily engaged with running processes, while low utilization suggest underuse. CPU utilization directly impacts the speed and efficiency of HPC applications 120. In an HPC application, when computational tasks are highly demanding, CPU utilization can help determine whether resources are sufficient to handle workloads. Overutilization can lead to performance bottlenecks, increased response times, and potential system instability, while underutilization can indicate inefficient resource allocation or overprovisioning.

Storage capacity refers to a total amount of data that a storage system can hold. It is typically measured in units like gigabytes (GB), terabytes (TB), or petabytes (TB). Storage capacity includes both the space used by files, applications, and metadata, as well as the remaining free space available for new data. HPC applications 120, such as simulations, machine learning, and big data analytics, often generate massive datasets that require substantial storage. In sufficient storage capacity can lead to system bottlenecks, slowdowns, or even failures if critical data cannot be written or accessed. Moreover, monitoring storage capacity ensures that the HPC application has enough headroom for temporary files, backups, and future data growth.

Network utilization refers to a percentage of available network bandwidth currently being used to transmit data between devices, servers, and/or nodes within a system or across external networks. Network utilization is related to a volume of data being transmitted, the speed of the network, and the capacity of the available bandwidth. High network utilization indicates that the network is handling a significant amount of traffic, whereas low utilization suggests underuse or idle capacity. HPC applications 120 often rely on distributed computing frameworks and parallel processing, where large datasets need move quickly between compute nodes, storage systems, and external clients. High network utilization can indicate potential bottlenecks, leading to latency, packet loss, and lower job execution times. On the other hand, low utilization might signal inefficient resource use or overprovisioned bandwidth.

The observed metrics 140 (including application level metrics and resource level metrics) are input to a recommendation engine 150. The recommendation engine 150 also receives HPC deployment map(s) 160 and information about cloud provider capabilities 170. An HPC map 160 may be generated for each HPC application. The HPC map 160 represents placement and interconnection of compute nodes, storage devices, networking infrastructure, and software applications. The cloud provider capabilities 170 may include different services, resources, and features offered by cloud platforms, such as AWS®, Microsoft Azure®, google cloud platform (GCP)®, and others. These capabilities may include compute resources (e.g., virtual machines, CPUs, GPUs), storage options (e.g., block storage, object storage, and file storage), and/or network solutions (e.g., high-speed interconnects, content delivery networks), and their associated costs and geographical locations.

The recommendation engine 150 analyzes the observed metrics 140 to identify inefficiencies, bottlenecks, or underutilized or over utilized resources, such as overprovisioned storage or CPUs running at capacity limits. Based on this analysis, the recommendation engine 150 determines where adjustments or actions 180 are needed to maintain performance, reduce latency, and/or optimize cost. The recommendation engine 150 also analyzes the HPC deployment map to identify current configuration of compute, storage, and networking resources, including their physical or virtual location and interconnections. The recommendation engine 150 uses such information to determine whether the current deployment is aligned with the workload requirements. For example, the recommendation engine 150 may recommend reallocating jobs to compute nodes closer to storage resources to minimize latency or leveraging underutilized CPUs or GPUs for specific tasks.

For example, the recommendation engine 150 may detect that a subset of compute nodes is operating at full capacity, causing performance bottlenecks, while other nodes remain idle. To address this, the recommendation engine 150 may suggest reallocating workloads from overloaded nodes to underutilized ones, optimizing resource utilization without compromising performance. As another example, the recommendation engine 150 may determine that certain compute tasks require frequent access to large datasets stored on remote storage, introducing latency issues. To mitigate this, the recommendation engine 150 may recommend migrating these workloads closer to storage resources, thereby reducing data transfer delays and enhancing system efficiency.

The recommendation engine 150 may also take into account of cloud provider capabilities, such as resource availability, costs, and geolocation, in generating recommendations. For example, cloud resource pricing can vary based on factors such as region, resource type, and usage duration. The recommendation engine 150 may suggest moving workloads to lower-cost regions or using alternative compute/storage options to reduce expenses. Further, physical location of cloud resources can impact performance (e.g., latency) and compliance (e.g., data sovereignty laws). The recommendation engine 150 may recommend selecting cloud regions closer to users or compliant with regulatory requirements.

For example, if the recommendation engine 150 determines that an HPC workload is running on expensive compute resources in Region A, but equivalent lower-cost compute instances are available in Region B, the recommendation engine 150 may recommend migrating the workload to region B to reduce costs while maintaining performance.

As another example, the recommendation engine 150 may detect that a particular workload involving frequent small read/write operations is currently running on HDD-based storage. The recommendation engine 150 may determine that the metadata IOPS for this workload significantly exceed the optimal threshold for HDDs, leading to processing delays. Additionally, the recommendation engine 150 may also determine that certain SSD resources are underutilized elsewhere in the system based on the HPC deployment map. To improve performance, the recommendation engine 150 may recommend migrating the workload to an SSD-based storage solution, which provides faster access times and higher IOPS, thereby reducing latency and improving overall efficiency. Conversely, for another workload that primarily involves sequential data writes and long-term storage, the recommendation engine 150 may determine that high-speed SSDs are being unnecessarily provisioned, increasing costs without providing a significant performance advantage. To optimize costs, the recommendation engine may recommend switching this workload to a lower-cost HDD storage, which is better suit for large, sequential write operations. These intelligent storage reallocation decisions help balance performance and cost efficiency across the HPC application.

Similarly, the recommendation engine 150 can also recommend compute resources to different workloads. For example, the recommendation engine 150 may detect that a machine learning training workload is currently running on general-purpose CPUs, leading to prolonged training time and inefficient resource utilization. The recommendation engine 150 may recommend switching the workload onto GPUs. Conversely, for another workload involving lightweight data processing and control logic, the recommendation engine 150 may determine that it is running on high-end GPUs or CPUs, which are expensive and unnecessary for this type of computation. The recommendation engine 150 may recommend shifting this workload to cost-efficient CPUs, which are better suited for handling sequential tasks and general-purpose computations while reducing operational costs. By dynamically reallocating workloads to the most suitable compute resources, the recommendation engine 150 optimizes both performance and cost efficiency in the HPC applications 120.

The recommended actions 180 are then implemented by the HPC application 120. As described above, the actions 180 may include (but are not limited to) modifying compute type and quantity, modifying storage type and capacity, modifying network performance, and/or modifying geolocation of compute and/or storage resources.

In some embodiments, the HPC application 120 may be an HPC storage system. Alternatively, the HPC application 120 may include an HPC storage system. The HPC storage system may be configured to manage the organization, allocation, and provisioning of storage resources for distributing and storing data across multiple storage devices, as well as to provision compute resources for managing file systems hosted on the storage resources.

Example HPC Storage System

Figure 2:
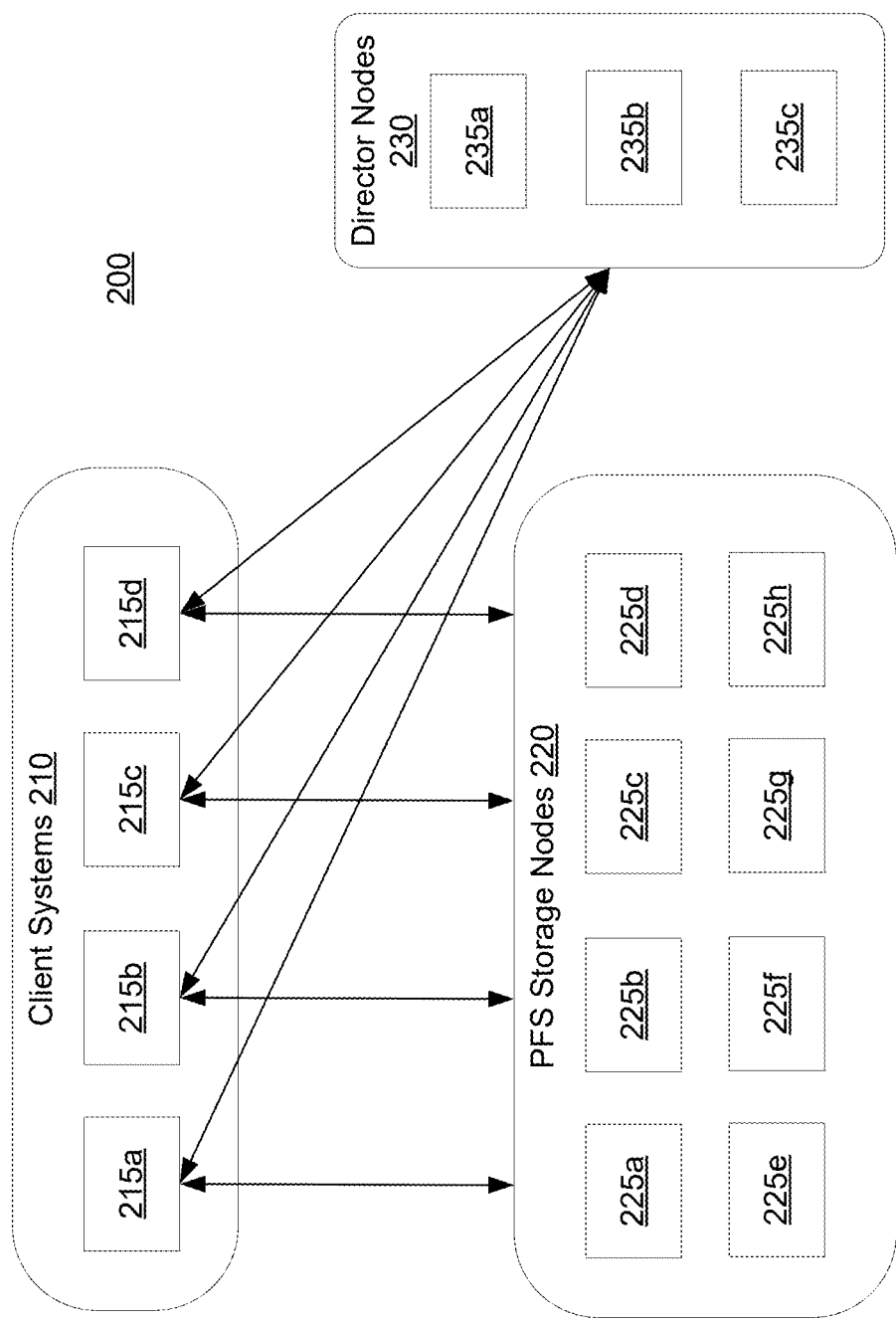
FIG. 2 illustrates the various components in the system environment of a storage system, in accordance with one or more embodiments.

FIG. 2 illustrates the various components in the system environment of an HPC storage system 200 (hereinafter also referred to as "the storage system"), according to an embodiment. The system environment of the storage system includes a set 210 of client systems 215a, 215b, 215c, 215d, a set 220 or storage nodes 225a, 225b, 225c, 225d, 225e, 225f, 225g, 225h and a set 230 of director nodes 235a, 235b, 235c. The director nodes 235 and storage nodes 225 are computer systems that run the storage system. A client system 215 includes a client driver that is a loadable software module that interacts with the director nodes and storage nodes to read and write the files stored by the storage system. Any required administration is performed via a graphical user interface (GUI) or call level interface (CLI) running on a director node 235. All the director nodes and storage nodes work together to provide a single file system namespace referred to as a realm.

According to an embodiment, the storage system 200 separates the control plane from the data plane. The director nodes 235 in the storage system form the control plane. The director nodes 235 perform various tasks including caching and modifying file system metadata (e.g., directories, file attributes, access permissions, etc.), coordinating the actions of the storage nodes 225 and the client drivers for file accesses, managing membership status of director and storage nodes within the storage system storage cluster, and controlling all failure recovery and data reliability operations. According to an embodiment, director nodes 235 are commodity compute servers with a high-speed networking connection, significant DRAM capacity, and a persistent store for transaction logs.

Storage nodes in the storage system form the data plane. Storage nodes represent the component of the overall architecture that stores data or metadata. While director nodes serve and modify file system metadata, they use storage nodes to store the metadata. The client driver is a loadable file system that is installed on compute servers and used by application programs running on a client system like any other file system. The client driver works with the director nodes and storage nodes to deliver a POSIX-compliant and cache-coherent file system behavior. Each file stored by the storage system is individually striped across many storage nodes, allowing each component piece of a file to be read and written in parallel, increasing the performance of accessing each file. For each file that the application wants to access, the client driver on the client system communicates over the network directly to all the storage nodes that hold that file's data.

The storage system scales out both director nodes 235 and storage nodes 225. For any given configuration of the system, additional director nodes can be added for more metadata processing performance. Similarly additional storage nodes can be added for more capacity or more storage performance.

Figure 3:
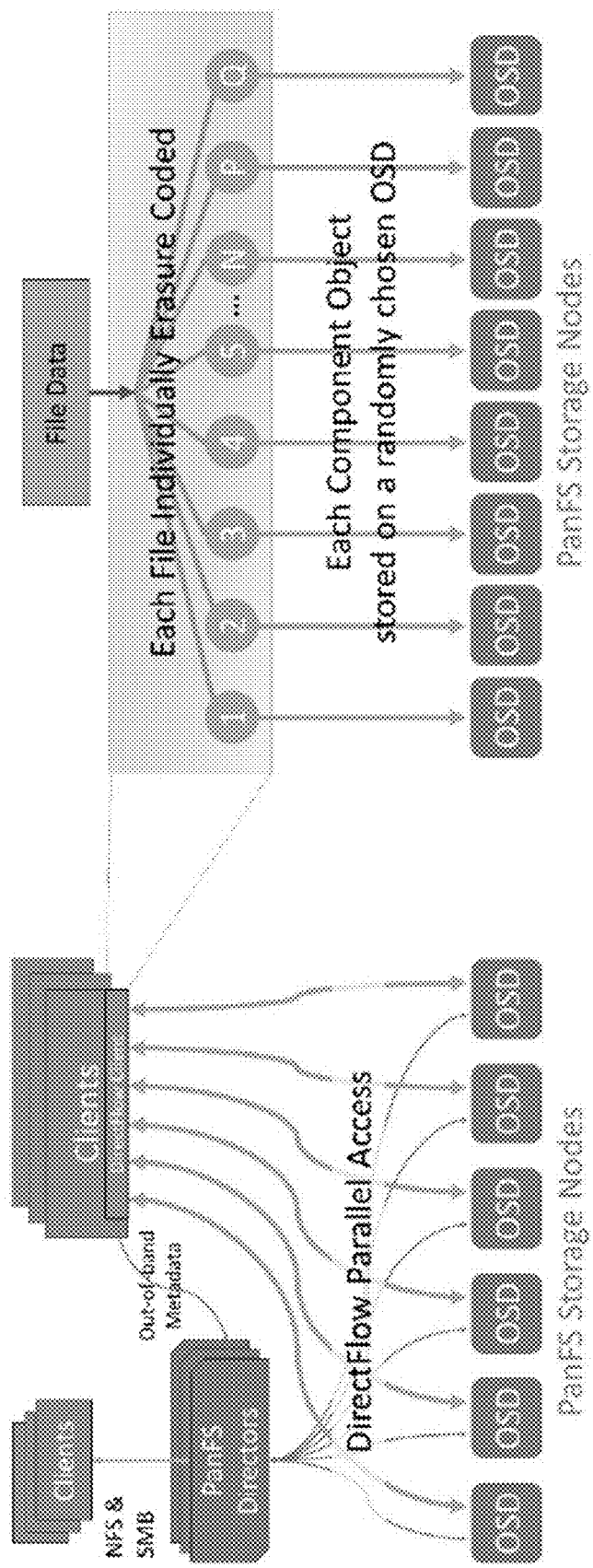
FIG. 3 illustrates how data is stored in a file in the storage system, in accordance with one or more embodiments.

FIG. 3 illustrates how data is stored in a file in the storage system, according to an embodiment. The storage system uses multiple storage nodes by assigning a map to each file. The map for a file shows where all the striped component parts of that file are located, and which storage node holds each part. The client driver uses the map to determine which storage nodes to access, directly or in parallel. storage system uses network erasure coding as part of that striping to ensure data integrity and reliability.

The client driver provides the semantics of a locally-mounted, POSIX-compliant file system. The storage system ensures that if a process P2 (possibly on another compute server) is writing to a file at the same time the process P1 is reading from the file, this process P1 will not read stale data. Accordingly, storage system provides cache coherency across all the nodes running the client driver.

Storage system performs random assignment of component objects to storage nodes to spread the load from file accesses across all those nodes. Typically, the number of storage nodes is much larger than the typical stripe width of a file. As a result, each file is very likely to only share a few storage nodes with any other files. This reduces the odds of any one storage node becoming overloaded and impacting the performance of the whole realm. As a result, the storage system provides a consistent system performance.

Figure 4:
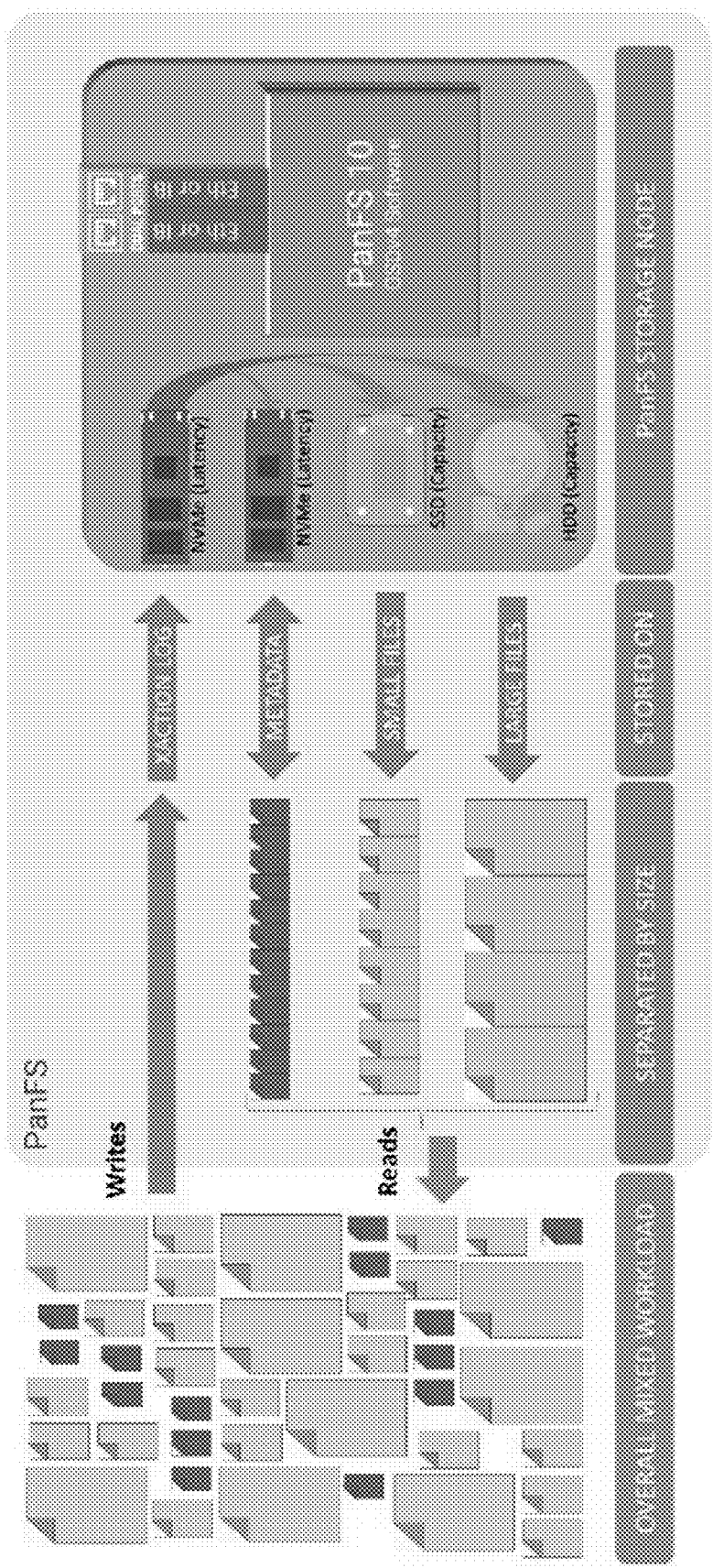
FIG. 4 illustrates the operation of storage nodes of the storage system, in accordance with one or more embodiments.

FIG. 4 illustrates the operation of storage nodes of the storage system, according to an embodiment. The storage system architecture provides performance and reliability advantages as well as significant performance optimizations using the storage node software to enable efficient use of the available storage media inside each storage node. The storage system storage node handles multiple performance tiers of storage. According to an embodiment, the different performance tiers of a storage node include storage class memory such as CXL (Compute Express Link's) persistent memory, latency optimized NVMe (non-volatile memory express) SSDs (solid state drives), capacity optimized SSDs, and HDDs (hard disk drives).

The storage node separates the storage of metadata from the storage of data. Metadata is usually composed of very small records that are accessed in unpredictable patterns and are typically latency sensitive. Directories are also metadata and are latency sensitive, that is often accessed sequentially. As a result of being small, typically having unpredictable access patterns, and being latency sensitive, the storage node stores metadata using a different storage mechanism than files storing user data, which are typically much larger and accessed sequentially. The storage node stores metadata in a database in one of the higher tiers of storage drives, typically an NVMe SSD, and stores bulk user file data in one of the lower tiers of drives, typically capacity-optimized SSDs or HDDs. The storage node uses the highest available tier of storage drives for storing a transaction log, committing the incoming data, metadata, or operations to stable storage, therefore allowing the application to continue its processing as quickly as possible.

The storage system takes advantage of the DRAM in each storage node as a low-latency cache of the most recently read or written data and metadata. The storage node stores small component objects in capacity-optimized SSDs that provide cost-effective and high-bandwidth storage. A POSIX file of less than a threshold size, for example, less than 1.5 MB size may be fully stored on SSDs. The storage system tries to keep each SSD full above a threshold level, for example, above 80% full. If an SSD falls below that threshold level, the storage system selects the smallest component objects from the next slowest set of drives and moves them to the SSD until it is about 80% full. If the SSD is too full, storage system moves the largest component objects on the SSD to the next slower tier of drives. Every storage node performs this optimization independently and continuously. A storage node selects component objects to move by looking in its local metadata database.

Storage nodes in the storage system are object storage devices (OSDs). An object stored in an OSD is a Small Computer System Interface (SCSI) object. The storage system can be configured to create a blade set (BladeSet) for different classes of storage nodes. For example, storage nodes with a capacity of 280 TB each should not be combined into the same blade set as storage nodes with a capacity of 132 TB each. This helps to evenly spread the workload across the pool of storage nodes and avoid hotspots. According to an embodiment, the storage system supports multiple blade sets in a realm and in the same namespace at the same time.

Figure 5:
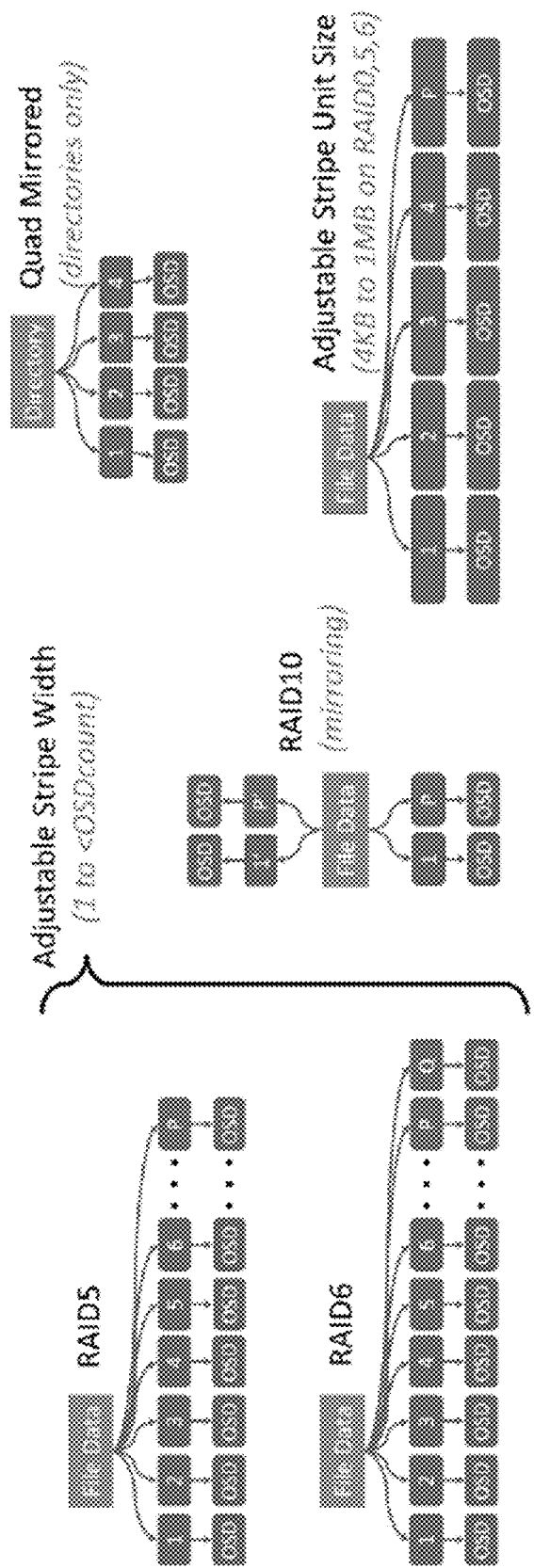
FIG. 5 shows the details of layout of a file stored in the storage system, in accordance with one or more embodiments.

FIG. 5 shows the details of layout of a file stored in the storage system, according to an embodiment. The storage system stripes a large POSIX file across a set of component objects and adds additional component objects into that stripe that store a plurality of data protection values, for example, the P and Q data protection values of an N+2 erasure coding scheme. P data represents parity data and Q data represents Q-parity data. The storage system stores large POSIX files using erasure coding across multiple component objects, and store small POSIX files using triple-replication across three component objects. This approach delivers higher performance and makes it more space efficient. Unless the first write to a file is a large one, the storage system starts as a small file. If a small file grows into a large file, the director node transparently transitions the file to the erasure coded format at the point that the erasure coded format becomes more efficient. When a file is created, and as it grows into a large file, the director node that is managing those operations randomly assigns each of the individual component objects that make up that file to different storage nodes. No two component objects for any file are assigned to the same failure domain.

If a storage system storage node fails, the storage system reconstructs only those component objects that were on the failed storage node. This is distinct from a RAID array that would reconstruct the entire raw capacity of the storage node. The storage system reads the component objects for each affected file from all the other storage nodes and uses each file's erasure code to reconstruct the component objects that were on the failed node.

When a BladeSet in the storage system is first set up, the storage system sets aside a configurable amount of spare space on all the storage nodes in that BladeSet to hold the output from file reconstructions. When the storage system reconstructs a missing component object, it writes it to the spare space on a randomly chosen storage node in the same BladeSet. As a result, during a reconstruction the storage system uses the combined write bandwidth of all the storage nodes in that BladeSet. The increased reconstruction bandwidth reduces the total time to reconstruct the affected files, which reduces the odds of an additional failure during that time, thereby increasing the overall reliability.

The N+2 erasure coding implemented by the storage system protects against two simultaneous failures within any given BladeSet without any data loss. More than two failures in a realm are automatically and transparently recovered from, as long as there are no more than two failed storage nodes at any one time in a BladeSet.

If a third storage node were to fail in a BladeSet while two others were being reconstructed, that BladeSet would immediately transition to read-only state, as a result. Only the files in the BladeSet that had component objects on all three of the failed storage nodes would have lost data, which becomes a smaller and smaller percentage as the size of the BladeSet increases. All other files in the BladeSet are unaffected or recoverable using their erasure coding.

Since the storage system maintains a complete directory tree, it can identify the full pathnames of precisely which files need to be restored from a backup or reacquired from their original source, and can therefore also recognize which files were either unaffected or recovered using their erasure coding.

Storage Reliability

A user may be allowed to configure reliability at an initial setup or configuration phase of the storage system. This occurs before the system begins processing data, as it allows the user to specify the desired reliability target based on the specific needs of their applications.

Generally, reliability includes durability and availability. Durability refers to the storage system's ability to avoid data loss over time. Availability refers to the ability of the system to remain online and accessible. Durability and availability are often expressed as percentage or "nines," where more nines represent better reliability.

Table 1 below shows statistics for storage systems based on the number of "nines" in their durability rating. The more nines, the less likely data loss is. For a system with 90% durability (1 nine), 1 out of every 10 systems is expected to experience data loss. For a system with 99% durability (2 nines), 1 out of every 100 systems is expected to have data loss. For 99.999% durability (5 nines), only 1 out of every 100,000 systems may experience data loss.

TABLE 1

| Nines | Percentage | How to think about it |
|---|---|---|
| 1 | 90% | For 10 systems 1 has data loss |
| 2 | 99% | For 100 systems 1 has data loss |

TABLE 1-continued

| Nines | Percentage | How to think about it |
|---|---|---|
| 3 | 99.9% | For 1000 systems 1 has data loss |
| 4 | 99.99% | For 10000 systems 1 has data loss |
| 5 | 99.999% | For 100000 systems 1 has data loss |

Table 2 below shows statistics for storage systems based on the number of "nines" in their availability rating. For example, "1 nine" represents 90% uptime, "2 nines" represent 99% uptime, and so on. Each additional nine represents a higher degree of system availability. The total number of minutes the system is online (available) in a year may be calculated based on the availability percentage. There are 525,600 minutes in a year (60 minutes×24 hours×365 days). A system with 90% availability is online for 473,040 minutes per year, and such a system will be down for 52,560 minutes (36.5 days) per year. A system with 99.999% availability is online for 525,594 minutes per year, and such a system will be down for only 5 minutes per year.

TABLE 2

| Nines | Percentage | Minutes online per year | Minutes Down per year |
|---|---|---|---|
| 1 | 90% | 473040 | 52560 (36.5 days) |
| 2 | 99% | 520344 | 5256 |
| 3 | 99.9% | 525074 | 525 |
| 4 | 99.99% | 525547 | 52 |
| 5 | 99.999% | 525594 | 5 |

As the number of nines (availability percentage) increases, the system's downtime decreases significantly. For example, moving from 3 nines (99.9%) to 5 nines (99.999%) reduces downtime from 525 minutes (about 9 hours per year) to just 5 minutes per year. As shown in Table 1, a small increase in the number of nines results in a significant reduction in system downtime, especially at higher levels of availability.

Different types of applications often have their targeted availability and durability. For example, systems like in-house testing environments or development servers might tolerate significant downtime (e.g., 90% availability), as their availability is less critical to the business. If these systems are down, it does not impact external users or production systems. Such systems may also tolerate occasional data loss since the data is often temporary or easy to recreate. Losing 1 out of 10 system in these environments may not have a significant business impact.

As another example, social media platforms may require a higher availability (e.g., 99.9% or 99.99% availability) due to the business nature of transactions and the need for 24/7 service. Such systems may also tolerate some level of data loss, as losing occasional user posts or non-critical content would not drastically impact overall platform functionality.

On the other hand, stock exchanges or real-time trading systems may require extremely high availability (e.g., 99.999% or even higher availability) to ensure transactions can be executed without delays, as downtime could lead to massive financial losses. Such systems may also require high durability to ensure that no transaction data is lost, as this could lead to significant financial losses.

In a storage system that stores data with partial redundancy, reliability may be determined based in part on data storing schemes, and a number of nodes in the storage system. Additional details on how durability and availability are determined are discussed further below with respect to FIG. 6.

Determining Durability

Figure 6:
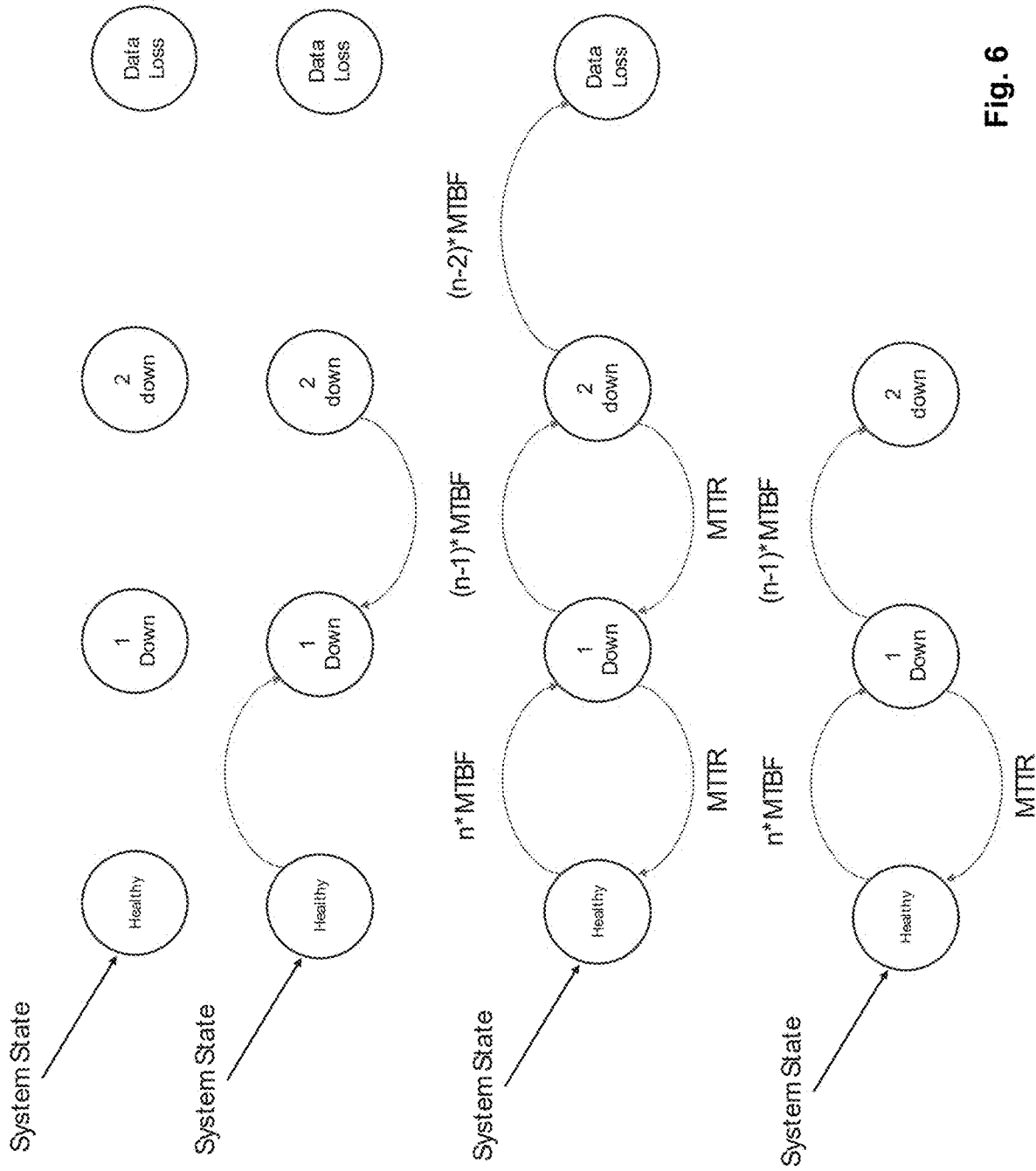
FIG. 6 illustrates states of a storage system and how they can be transitioned between each other, in accordance with one or more embodiments.

FIG. 6 illustrates states of a storage system and how they can be transitioned between each other, in accordance with one or more embodiments. The storage system transitions between different states, namely healthy, 1 down, 2 down, and data loss, over time. Healthy indicates that the storage system is fully functional, with no failures. 1 down indicates one node of the system has failed. 2 down indicates two nodes have failed. Data loss indicates the system can no longer recover data, and data loss occurs. Mean time between failure (MTBF) represents an average time between failures in the storage system. N*MTBF refers to an average time it takes for the first failure in the system, where n is a number of total nodes, (n−1)*MTBF represents the time it takes for the second failure to occur after the first failure, given that (n−1) nodes are left functioning. (n−2)*MTBF represents the time it takes for the third failure to occur after two failures have already happened. Mean time to repair (MTTR) represents the time it takes to repair a failed component or node in the system and restore the system to a healthy state.

As illustrated in FIG. 6, the storage system starts in a healthy state, meaning no nodes or components have failed. The storage system can stay in this state for n*MTBF, which is the mean time before a failure occurs across the entire system. After the first failure, the system transitions to the 1 down state. The system is still operational but one node has failed. If the failure is repaired within the MTTR, the system can go back to the heathy state. If another node fails before the first failure is repaired, the system moves into the 2 down state. The time to this transition is represented by (n−1)*MTBF. After a second failure, the system is now in the 2 down state. If the system can tolerate two failures (such as in erasure coding with 2 redundancy), it can still operate. The system can transition back to the 1 down state if one of the failed nodes is repaired within the MTTR. If a third failure occurs while the system is in the 2 down state, data is lost, and the system transitions to the data loss state. The time to this final failure is represented by (n−2)*MTBF. If a third failure occurs while the system is in the 2 down state, data is lost, and the system transitions to the data loss state. Once in this state, data is irrecoverable unless external backups or other recovery methods are in place.

Durability depends on the probabilities of transitioning between states. The factor in durability is how quickly the system can recover from failures (via MTTR) compared to how quickly subsequent failures occur (via MTBF). The longer the MTBF and the shorter the MTTR, the higher the durability of the system. If the system can repair components faster than failures occur, it is more likely to stay in the healthy or 1 down state, maintaining data durability. If multiple failures occur before the system can repair the previous failures, the likelihood of reaching the data loss state increases.

A redundant array of independent disks (RAID) is a data storage technology that combines multiple physical disk drives into a single logical unit to achieve improvements in data reliability. RAID systems use various techniques like data redundancy (through mirroring or parity) and striping (spreading data across multiple disks) to ensure data is protected from hardware failures and can be accessed quickly. Stripping is a technique where data is divided into smaller chunks and spread across multiple disks. This can improve performance because read/write operations are distributed over multiple disks, allowing for parallel access. Mirroring is a technique where data is duplicated and stored on more than one disk. This ensures that if one disk fails, the data is still available from the other disks. Parity is data used to recover lost data in case of a disk failure. Parity data is spread across multiple disks and helps reconstruct data from the remaining disks if one fails.

RAID levels refer to the different ways RIAD can be configured to provide various balances of fault tolerance, data redundancy, performance, and storage efficiency. Different RAID levels suit different needs, such as maximizing speed, ensuring data safety, or offering a balance between the two. In RAID 0, data is divided and written across multiple disks to improve read and write speeds, but no redundancy is provided. In RAID 1, the same data is written to two disks. If one disk fails, the other disk continues to function. RAID 5 and RAID 6 are erasure coding schemes, which use parity chunks to recover from disk failures. Parity is distributed across disks, allowing recovery of data if a disk fails (one disk in RAID 5, two disks in RAID 6). RAID 10 uses both RAID 1 mirroring (for redundancy) and RAID 0 striping (for performance). RAID 60 uses both RAID 0 (for striping) and RAID 6 (for redundancy).

MTTDL of a RAID system can be represented by:

$$MTTDL_{RAID} = \frac{(n - C - 1)! * MTBF^{C+1}}{n! * MTTR^C} \quad \text{Equation (1)}$$

where C is parity chunks, n is a number of data chunks, MTBF is an average time between successive failures in the system measured in hours, MTTR is an average time it takes to repair a failed node or disk in the RAID system.

As discussed above MTTDL represents an average time until the RAID system loses data due to multiple failures that exceed the redundancy built into the system. Equation (1) determines a likelihood of data loss by considering the number of parity chunks C, the number of data chunks n, and the time between failures (MTBF) and repairs (MTTR). The factorials (e.g., n!) reflect the combinatorial possibilities of failures occurring in the RAID system, a higher MTTDL indicates a more reliable system that is less likely to lose data over time.

MTTDL of a RAID 6 system can be represented by:

$$MTTDL_{R6} = \frac{MTBF^3}{n * (n - 1) * (n - 2) * MTTR^2} \quad \text{Equation (2)}$$

where n is a number of data chunks, a number of parity chunks C is 2.

Because the number of parity chunks is 2, in Equation (2), MTTR is raised to the power of 2, indicting a combined time it takes to repair two failed components, and MTBF is raised to the power of 3=(2+1), indicating that RAID 6 can withstand up to two failures and still survive, but data is lost upon a third failure. the expression n*(n−1)*(n−2) reflects the decreasing number of available nodes as failure occur.

Distributed RAID is a RAID architecture that extends traditional RAID functionality by distributing both data and parity across multiple nodes in a distributed system rather than within a single RAID array, offering enhanced fault tolerance, scalability, and performance. For example, distributed RAID 6 combines the principles of RAID 6 with the distributed architecture. Similar to traditional RAID 6, distributed RAID 6 uses striping with double parity. Data is broken into chunks and written across multiple nodes, and two sets of parity data are calculated and stored. The parity data allows the system to recover from the failure of up to two nodes or disks. Distributed RAID 6 can handle two simultaneous failures (whether at the disk or node level). In the event of a failure, the system can reconstruct the lost data using the remaining data and the two sets of parity information.

MTTDL of a distributed RAID 6 system can be represented by:

$$MTTDL_{dR} = MTTDL_{R6} * \left(\frac{D}{n}\right)^{\frac{C*(C-1)}{2}} \quad \text{Equation (3)}$$

where D is a total number of nodes in the distributed RAID 6 system, C is parity chunks, n is a number of data chunks.

Durability of the distributed RAID 6 system can be represented by:

$$\text{Durability} = \frac{-t}{e^{MTTDL_{dR}}} \quad \text{Equation (4)}$$

where t is years in hours.

9 s of durability can be represented by:

$$9 \text{ s of durability} = -\log_{10}(1-\text{Durability}) \quad \text{Equation (5)}$$

9 s of durability is a measure used to express the durability of a system in terms of "nines." For example, five nines of durability means that the system is 99.999% durable. Equation (5) translates the durability probability into the number of "nines." A higher number of nines means the system has a very low probability of data loss.

For example, annualized failure rate (ARF) is 18%, where ARF represents the percentage chance that a disk will fail over the course of a year. A higher AFR indicates a higher likelihood of failure. MTBF can be calculated as a total operating time (in hours) in a year divided by the failure rate, i.e., MTBF=8760/18%=48666 hours, representing an average time between failures of a disk. Assuming object storage device (OSD) capacity is 162 terabyte (TB), data transfer rate during rebuild operations after a failure is 720 MB/s, n=10 (8+2) indicating that the RAID 6 configuration uses 8 data blocks and 2 parity blocks, and D=12 nodes indicating a total number of nodes in the distributed RAID system. Based on these parameters, MTTR=162*1024*1024/720/360=65.5 hours.

Applying the above example specification values to Equations (3)-(5), $$MTTDL_{R6} = \frac{48666^3}{10*(10-1)*(10-2)*65.5^2}$$

$$MTTDL_{R6} = 37313145$$

$$MTTDL_{dR} = MTTDL_{R6} * \left(\frac{12}{10}\right)^{\frac{2*(2-1)}{2}}$$

$$MTTDL_{dR} = 44775774$$

$$\text{Durability} = \frac{-8760}{e^{MTTDL_{dR}}} = 0.999804$$

$$9s \text{ of durability} = -\log_{10}(1-0.999804) = 3.7$$

As such, 9 s durability of the storage system is 3.7 nines.

In some embodiments, a storage system is in a hierarchical configuration combining different RAID levels. FIG. 6 illustrates an example 2-level configuration RAID 60, which combines RAID 0 and RAID 6, in accordance with one or more embodiments. The system is configured with RAID 6 subsystem at a bottom level and RAID 0 subsystem at a top level, providing high fault tolerance from RAID 6 subsystem and performance from RAID 0 subsystem. Bottom level RAID 6 subsystem applies an 8+2 erasure configuration, meaning 8 data chunks (D) and 2 parity chunks (P and Q). RAID 6 subsystem can tolerate the failure of two disks. Top level RAID 0 subsystem stripes data across 8 data disks, corresponding to the 8 data disks of the RAID 6 subsystem. RAID 0 subsystem does not provide redundancy, meaning if a RAID 0 subsystem's disk fails, the system cannot recover the data. However, RAID 6 subsystem provides high durability.

Similar to the RAID 6 system described above, durability of the RAID 6 subsystem can be represented by:

$$MTTDL_{R6} = \frac{MTBF^3}{n*(n-1)*(n-2)*MTTR^2} \quad \text{Equation (2)}$$

$$\text{Durability} = \frac{-t}{e^{MTTDL_{dR}}} \quad \text{Equation (4)}$$

where MTBF is mean time between failures, n is a number of disks in the RAID 6 subsystem.

Durability for the RAID 0 subsystem can be represented by:

$$MTTDL_{R0} = n*\lambda \quad \text{Equation (6)}$$

$$MTBF = \frac{8760}{\lambda} \quad \text{Equation (7)}$$

where MTBF is mean time between failures, λ is a rate of failure for each RAID 6 array, n is a number of data chunks in the RAID 6 subsystem corresponding to the number of data disks in the RAID 6 subsystem and the number of data disks in the RAID 0 subsystem, 8760 is a number of hours in a year.

Referring back to Equation (1), the factors that influence durability include the number of parity chunks (C) and the number of data chunks (n). By increasing the number of parity chunks (C), the amount of redundancy in the system increases, making it more resilient to failures, and vice versa. Additionally, reducing the number of data chunks (n) while keeping parity the same means there are fewer data blocks to protect, which also increases the system's ability to tolerate failures before data is lost, and vice versa. For example, erasure scheme 4+2 (with 4 data blocks and 2 parity blocks) is more durable than erasure scheme 8+2 (with 8 data blocks and 2 parity blocks). As another example, erasure scheme 8+2 is more durable than erasure scheme 8+1 (with 8 data blocks and 1 parity block).

On the other hand, referring to Equation (3), durability is also associated with a number of OSDs (D). A greater number of OSDs also results in a greater durability.

Determining Availability

As discussed above, reliability also includes availability. The availability of a storage system may also be determined based on the data storing scheme and a number of nodes. Referring back to FIG. 6, the storage system transitions between different states, namely, healthy, 1 down, 2 down, and not available. MTBF is an average time that a system operates before a failure occurs. The term n*MTBF represents the time until the first failure, and similarly, (n−1)*MTBF and (n−2)*MTBF represent the times until subsequent failures. MTTR is an average time required to repair or restore the system after a failure.

As illustrated, the system is initially in the heathy state. The system remains in this state until a failure occurs, with the time before failure being n*MTBF. After a first failure, the system transitions to the 1 down state, where one component has failed. If repairs are made within the MTTR, the system can return to the healthy state. If the repair is not made before another failure occurs (i.e., before (n−1)*MTBF), the system transitions to the 2 down state. In this state, two components have failed. The system can still return to a healthier state if repairs are made within the MTTR, allowing to go back to the 1 down state or eventually the healthy state. If a third failure occurs (i.e., before (n−2)*MTBF) and repairs have not been completed, the system transitions to the not available state. This is the failure state where the system is no longer operational, as too many failures have occurred without successful repair. Once the system reaches this state, availability is lost, and the system cannot function until repairs are made.

Availability is determined by how often the system can recover from failures and remain operational. It depends in part on MTBF and MTTR. A system has high availability if failures are infrequent (high MTBF), meaning it spends a long time in the healthy state, and/or repairs are quick (low MTTR), meaning the system can return to the healthy state quickly after a failure. As such, the system has multiple chances to recover as long as repairs are made within the MTTR. If the system successfully repairs failures after transitioning to 1 down or 2 down, it avoids the not available state and maintains availability. Notably, there are differences between durability and availability. Durability focuses on data preservation. Availability focuses on system uptime.

Data availability mean time to not available (MTTNA) of a storage system can be represented by:

$$MTTNA_{RAID} = \frac{(n - C - 1)! * MTBF^{C+1}}{n! * MTTR^{C+1}}, \quad \text{Equation (8)}$$

where C is a number of parity chunks, n is a number of servers, switches, etc.

MTTNA of a RAID 6 system can be represented by:

$$MTTNA_{R6} = \frac{MTBF^3}{n*(n-1)*(n-2)*MTTR^3}, \quad \text{Equation (9)}$$

where n is a number of servers, switches, etc.

MTTNA of a distributed RAID 6 system can be represented by:

$$MTTNA_{dR} = MTTNA_{R6} * \left(\frac{D}{n}\right)^{\frac{C*(C-1)}{2}}, \quad \text{Equation (10)}$$

where D is a total number of nodes in the distributed RAID 6 system, n is a number of servers, switches, etc.

Availability of the distributed RAID 6 system can be represented by:

$$\text{Availability} = \frac{-t}{e^{MTTNA_{dR}}}, \quad \text{Equation (11)}$$

where t is years in hours.

9 s of availability can be represented by:

$$9 \text{ s of availability} = -\log_{10}(1 - \text{Availability}) \quad \text{Equation (12)}$$

9 s of availability is a measure used to express the availability of a system in terms of "nines." For example, five nines of availability means that the system is 99.999% available. Equation (10) translates the availability probability into the number of "nines." A higher number of nines means the system has a very low probability of not available.

For example, annualized failure rate (ARF) is 5%, where ARF represents the percentage chance that a disk will fail over the course of a year. A higher AFR indicates a higher likelihood of failure. MTBF can be calculated as a total operating time (in hours) in a year (24×365) divided by the failure rate, i.e., MTBF=8760/5%=175200 hours, representing an average time between failures of a disk. Assuming MTTR is 24 hours, n=10 (8+2) indicating that the RAID 6 configuration uses 8 data blocks and 2 parity blocks, and D=12 nodes indicating a total number of nodes in the distributed RAID system.

Applying the above example specification values to Equations (10)-(12), $$MTTNA_{R6} = \frac{175200^3}{10*(10-1)*(10-2)*24^3}$$

$$MTTNA_{R6} = 5.403e8$$

$$MTTNA_{dR} = MTTNA_{R6} * \left(\frac{12}{10}\right)^{\frac{2*(2-1)}{2}}$$

$$MTTNA_{dR} = 6.4386e8$$

$$\text{Availability} = e^{\frac{-8760}{MTTNA_{dR}}} = 0.999986$$

$$9s \text{ of availability} = -\log_{10}(1 - 0.999986) = 4.8$$

As such, 9 s of availability of the storage system is 4.8 nines.

As another example, annualized failure rate (ARF) is 1%, where ARF represents the percentage chance that a disk will fail over the course of a year. A lower AFR indicates a lower likelihood of failure. MTBF can be calculated as a total operating time (in hours) in a year (24×365) divided by the failure rate, i.e., MTBF=8760/1%=876000 hours, representing an average time between failures of a disk. Assuming MTTR is 72 hours, n=10 (8+2) indicating that the RAID 6 configuration uses 8 data blocks and 2 parity blocks, and D=10 nodes indicating a total number of nodes in the distributed RAID system.

Applying the above example specification values to Equations (10)-(12), $$MTTNA_{HA} = \frac{876000^2}{10*(10-1)*72^2}$$

$$MTTNA_{HA} = 1.64e6$$

-continued $$\text{Availability} = e^{\frac{-8760}{MTTNA_{dR}}} = 0.994$$

$$9s \text{ of availability} = -\log_{10}(1 - 0.994) = 2.3$$

As such, 9 s of availability of the data system is 2.3 nines.

Referring back to Equation (8), the factors that influence durability include the number of parity chunks (C) and the number of servers, switches (n). On the other hand, referring to Equation (8), availability is also associated with a number of OSDs (D). A greater number of OSDs also results in a greater availability.

Example Architecture of Director Node

Referring back to FIG. 2, in an HPC storage system 200, director nodes 235 in the storage system form the control plane. The director nodes 235 are also configured to collect performance metrics and other information and dynamically reallocate storage and/or compute resources based on the collected information.

Figure 7:
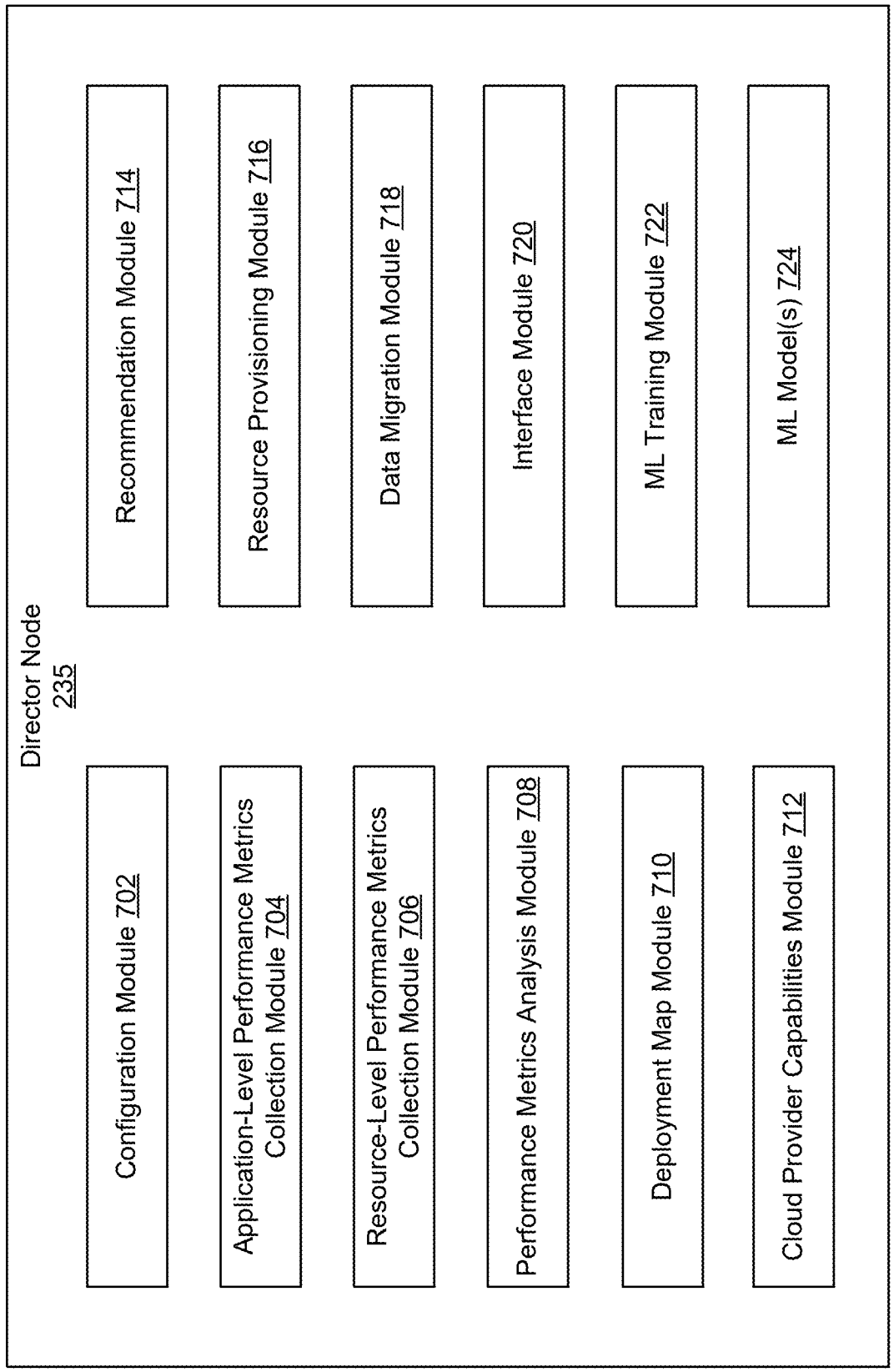
FIG. 7 illustrates an example architecture of a director node configured to dynamically allocate resources for a storage system, in accordance with one or more embodiments.

FIG. 7 illustrates an example architecture of a director node 235 configured to dynamically allocate resources for the storage system 200, in accordance with one or more embodiments. The director node 235 includes a configuration module 702, an application-level performance metrics collection module 704, a resource-level performance metrics collection module 706, performance metrics analysis module 708, deployment map module 710, cloud provider capabilities module 712, recommendation module 714, resource provisioning module 716, data migration module 718, interface module 720, machine learning (ML) training module 722, and ML model(s) 724. Modules in FIG. 7 are merely illustrative examples. Additional or fewer modules may be implemented in the director node 235. Modules within the director node 235 can be configured flexibly: multiple modules may be combined into one to perform a range of functions, or a single module might be split into several, with each handling a specific subset of tasks.

The configuration module 702 is configured to set criteria for the storage system, such as minimum and maximum client sessions, minimum and maximum metadata IOPS, minimum and maximum file transfer speeds, minimum and maximum file IOPS, and minimum and maximum file storage across extents, and minimum reliability, among others. In some embodiments, the configuration module 720 automatically sets criteria based on the attributes of an underlying HPC application. Alternatively, the configuration module 720 sets the criteria based on user input.

The application-level performance metrics collection module 704 is configured to monitor and collect real-time performance data related an underlying HPC application (which may be a storage management application or another application that uses the storage system). The metrics include (but are not limited to), a number of active client sessions, metadata input/output operations per second (IOPS), file IOPS, file bandwidth, and file extents. In some embodiments, the application-level metrics may be collected from application logs that record events, errors, and performance statistics. In some embodiments, the application-level metrics may be collected via API or telemetry interfaces, such as Prometheus metrics exporters, RESTful APIs of the HPC application, and Grafana or ELK stack (e.g., Elasticsearch, Logstash, Kibana) for real-time monitoring. In some embodiments, the application-level metrics may be collected from kernel-level performance counters that expose performance metrics for the HPC application, such as perf tool, eBPF (Extended Berkeley Packet Filter), /proc and /sys filesystem for tracking process-level resource usage. In some embodiments, metadata IOPS and file IOPS may be tracked via storage system APIs (e.g., Lustre, GPFS, Ceph, AWS S3 metrics). In some embodiments, bandwidth may be measured using throughput logs and storage analytics tools. File extents tracking may be obtained from file system metadata tools, such as xfs_bmap, stat, or lsattr. In some embodiments, network activity may be tracked via Netstat for TCP/UDP traffic statistics, Iperf for network bandwidth measurement, among others. Above described mechanisms for collecting application-level performance metrics are merely a few example. Monitoring tools can be custom integrated directly into the application to collect fine-grained or any desired granularity leveled metrics.

The resource-level performance metrics collection module 706 is configured to collect resource-level performance metrics. Resource-level performance metrics include (but are not limited to) processor utilization, storage capacity, and/or network utilization. In some embodiments, system monitoring tools such as top, htop, and mpstat may be used to collect real-time CPU and GPU statistics. These tools can track per-core utilization, active processes, and execution time. Advanced performance counters, including Intel VTune and AMD ROCm SMI, may also be used to provide profiling of CPU execution efficiency and power consumption. For GPU-intensive workloads, nvidia-smi and CUDA profilers may be used to track GPU memory usage, core activity, and execution latency. In some embodiments, storage resources can be tracked based on disk usage metrics through file system commands such as df-h for total capacity, du-sh for per-directory usage, and statfs( ) for low-level file system statistics. Real-time I/O performance data may be collected using iostat, which reports disk read/write speeds and utilization, and iotop, which identifies processes consuming high I/O resources. Network utilization may be collected using ifconfig, ip -s link, and netstat -i, which provide insights into transmitted and received packets, errors, and dropped connections. For bandwidth consumption, tools like iftop and bmon may be used to visualize real-time network traffic per host, and nload may be used to track the rate of data transmission over time. latency and packet loss may also be monitored using ping for response times, traceroute for hop delays, and mtr for continuous packet flow analysis.

The performance metrics analysis module 708 is configured to interpret and analyze application-level performance metrics and resource-level performance metrics collected by module 704 and 706. In some embodiments, the performance metrics analysis module 708 analyzes these performance metrics against predetermined thresholds to detect inefficiencies, prediction system failures, or overprovisioning. These thresholds may be set by the user via the configuration module 702, or automatically set based on historical performance data. For example, CPU utilization exceeding 85% for 10 minutes may indicate compute resource saturation; storage utilization exceeding 90% may indicate storage resource shortage; packet loss exceeding 2% may indicate low network bandwidth, among others. In some embodiments, the performance metrics analysis module 708 may apply machine learning models trained using historical data to predict potential threshold violations.

The deployment map module 710 is configured to generate a deployment map that represents the placement and interconnections of compute, storage, and network resources within the storage system. In some embodiments, the deployment map module 710 is configured to scan and enumerate all available resources, including compute nodes, storage devices, and network infrastructure. In some embodiments, APIs provided by cloud service providers may be used to extract metadata about CPU, GPU, and memory. Storage system APIs, such as Lustre, GPFS, CephFS, may be used to extract metadata about mounted storage, RAID configuration, and file distribution. The deployment map module 710 can identify links between compute nodes, storage clusters, and networking components (e.g., InfiniBand, Ethernet, cloud VPCs) based on the metadata about the resources.

The cloud provider capabilities module 712 is configured to obtain cloud provider capabilities, such as resource availability, costs, and geolocations. Resource availability refers to the types, configurations, and real-time availability of cloud resources, including CPUs, GPUs, storage, and networking, which can be obtained via cloud provider APIs. Cost and pricing information may be obtained via cloud pricing APIs and databases. Geolocation information determines which cloud region or availability zone available to serve a workload, which can be obtained via cloud regional data centers and availability zones APIs.

The recommendation module 714 is configured to recommend one or more actions based on the analysis of the application-level performance metrics, resource-level performance metrics, deployment map, and/or cloud provider capabilities. The one or more actions may include (but are not limited to) modifying compute resource type and/or quantity, modifying storage resource type and/or capacity, modifying network performance, and/or modifying geolocation of compute resource or storage resource.

In some embodiments, the recommendation module 714 applies a trained machine learning model 724 trained on historical performance metrics data. The trained machine learning model 724 is configured to receive the application-level performance metrics, resource-level performance metrics, and the HPC deployment map as input to output one or more recommended actions. In some embodiments, the recommendation module 714 further applies a trained machine learning model 724 to predict performance metrics at a future time and preemptively adjusting resources based on the prediction before the future time.

For example, when an HPC application experiences high CPU utilization, the module may recommend provisioning additional compute nodes or transitioning from general-purpose CPUs to high-performance processors like GPUs or TPUs to accelerate computation. Conversely, if an application runs on underutilized high-end instances, the module may suggest scaling down to reduce operational costs. For workloads requiring specialized computation, such as AI training, financial modeling, or molecular simulations, the module may recommend switching from CPUs to GPUs or FPGAs for optimized parallel processing. Additionally, the module considers cloud provider capabilities, identifying cost-effective compute instances (e.g., spot instances, reserved instances, or burstable VMs) to optimize performance without unnecessary expenses.

When storage capacity nears its limit, the recommendation module 714 may suggest scaling up storage allocations to prevent disruptions. If a workload shows high IOPS demand on HDD-based storage, the module may recommend migrating critical datasets to SSDs or NVMe storage for faster access speeds. Conversely, if rarely accessed (cold) data is stored on expensive high-performance drives, the module may suggest moving it to cost-effective archival storage, such as AWS Glacier or Azure Blob Cold Storage. In distributed HPC environments, the module also evaluates erasure coding, RAID configurations, and object storage strategies to ensure high availability and fault tolerance.

In some embodiments, if network congestion or packet loss is detected, the recommendation module 714 may recommend increasing bandwidth allocation, rerouting traffic through optimized paths, or deploying network acceleration technologies such as RDMA (Remote Direct Memory Access). In multi-cloud or hybrid environments, the recommendation module 714 analyzes inter-region communication latency and may suggest migrating workloads to a closer region to minimize data transfer delays. Additionally, for applications handling large data movements, such as distributed training of AI models or large-scale simulations, the recommendation module 714 may recommend dedicated high-bandwidth interconnects to enhance network efficiency.

In some embodiments, if an HPC workload is running in a distant cloud region, resulting in high latency for end-users, the module may suggest migrating it to a closer region to enhance performance. Additionally, when cloud pricing models indicate lower-cost compute or storage options in a different region, the module may recommend relocating workloads to reduce costs while maintaining efficiency. For compliance-sensitive applications, such as healthcare or financial services, the module ensures that data remains in region-specific data centers to adhere to regulations like GDPR (Europe) or HIPAA (United States).

The resource provisioning module 716 is configured to provision or deprovision compute, storage, and network resources based on the one or more actions recommended by the recommendation module 714. When the system detects that workloads require additional resources—such as increased CPU/GPU power, expanded storage capacity, or enhanced network bandwidth—the provisioning module automatically allocates the necessary resources to maintain optimal system performance. Similarly, when resources are underutilized or no longer needed, the module 716 deprovisions them to minimize costs and improve efficiency.

For compute resources, the module 716 provisions virtual machines (VMs), bare-metal servers, GPUs, or FPGAs based on workload requirements, scaling up or down as necessary. For cloud-based environments, it interacts with cloud provider APIs (e.g., AWS EC2, Azure Virtual Machines, Google Compute Engine) to select the most cost-effective and available instance types. In on-premises HPC clusters, it integrates with job schedulers to allocate resources efficiently.

For storage resources, the module provisions block storage (e.g., SSDs, HDDs), object storage (e.g., S3, Azure Blob), or distributed file systems (e.g., Lustre, CephFS, GPFS) based on data access frequency and IOPS requirements. When storage utilization exceeds predefined thresholds, it expands storage capacity or migrates data to a more suitable storage tier. Conversely, if excess storage is allocated but underutilized, the module deprovisions it to optimize costs.

For network resources, the module provisions bandwidth, virtual networks, high-speed interconnects (e.g., InfiniBand, RDMA), and content delivery networks (CDNs) to support high-performance data transfers. It ensures that workloads experiencing high latency or network congestion receive additional bandwidth or rerouted traffic paths for improved efficiency. In multi-cloud and hybrid environments, the module adjusts network configurations dynamically to balance performance across different cloud regions.

The data migration module 718 is configured to transfer data across storage tiers, compute nodes, and cloud regions based on one or more actions recommended by the recommendation module 714. When an application requires low-latency data access, the module 718 migrates frequently accessed datasets to high-performance NVMe SSDs or memory-optimized storage, ensuring minimal retrieval delays. Conversely, cold data that is rarely accessed may be moved to cost-efficient archival storage solutions, such as AWS Glacier, Azure Blob Cold Storage, or on-premises tape libraries, reducing unnecessary storage costs.

For compute-driven data migration, the module 718 moves datasets closer to the processing nodes to minimize network overhead, ensuring faster execution of AI training, scientific simulations, and/or large-scale data analytics workloads. In cloud and hybrid environments, the module 718 enables geographical data migration by transferring data across cloud regions or edge computing nodes to reduce latency for distributed users and comply with data residency regulations (e.g., GDPR, HIPAA). In some embodiments, the module 718 supports automated replication and failover mechanisms, ensuring data integrity and availability even during storage node failures or system upgrades.

The interface module 720 is configured to provide a user interface for users. In some embodiments, the user interface is configured to send recommended actions to users. In response to receiving user approval of the recommended actions, the interface module 720 then triggers the resource provisioning module 716 and data migration module 718 to execute the recommended actions. Alternatively, the recommended actions are executed automatically, and the interface module 720 is configured to notify the user that the recommended actions have been executed. Additionally, in some embodiments, the interface module 720 is also configured to generate reports that present application-level performance metrics, resource-level performance metrics, the deployment map, and/or cloud provider capabilities, along with justifications for the recommended actions.

The machine learning (ML) training module 722 is configured to train one or more ML models 724. In some embodiments, one or more ML models 724 include models trained to receive application-level performance metrics, resource-level performance metrics, deployment map, and/or cloud provider capabilities as input and output one or more recommended actions. In some embodiments, the one or more ML models 724 include models trained to predict future application-level performance metrics and/or resource-level performance metrics. In response to predicting workload demands, the recommendation module 714 may be proactively recommend one or more actions, preventing performance bottlenecks.

The training data may include historical application-level performance metrics, resource-level performance metrics, deployment map data, and/or cloud provider capabilities labeled with recommended actions. The models 724 may be trained via various machine leaning techniques, such as (but not limited to) random forest, XGBoost, logistic regression, SVM, isolation forest, autoencoders, neural networks, among others. The ML model 724 is trained to receive application-level performance metrics, resource-level performance metrics, deployment map, and/or cloud provider capabilities as input to output one or more recommended actions.

In some embodiments, another model 724 may be trained via time-series forecasting algorithms, such as ARIMA, LSTM, and/or Prophet to predict future trend based on the current performance metrics, deployment map data, and/or cloud provider capabilities.

Example Method for Dynamically Provisioning Resources for HPC Applications

Figure 8:
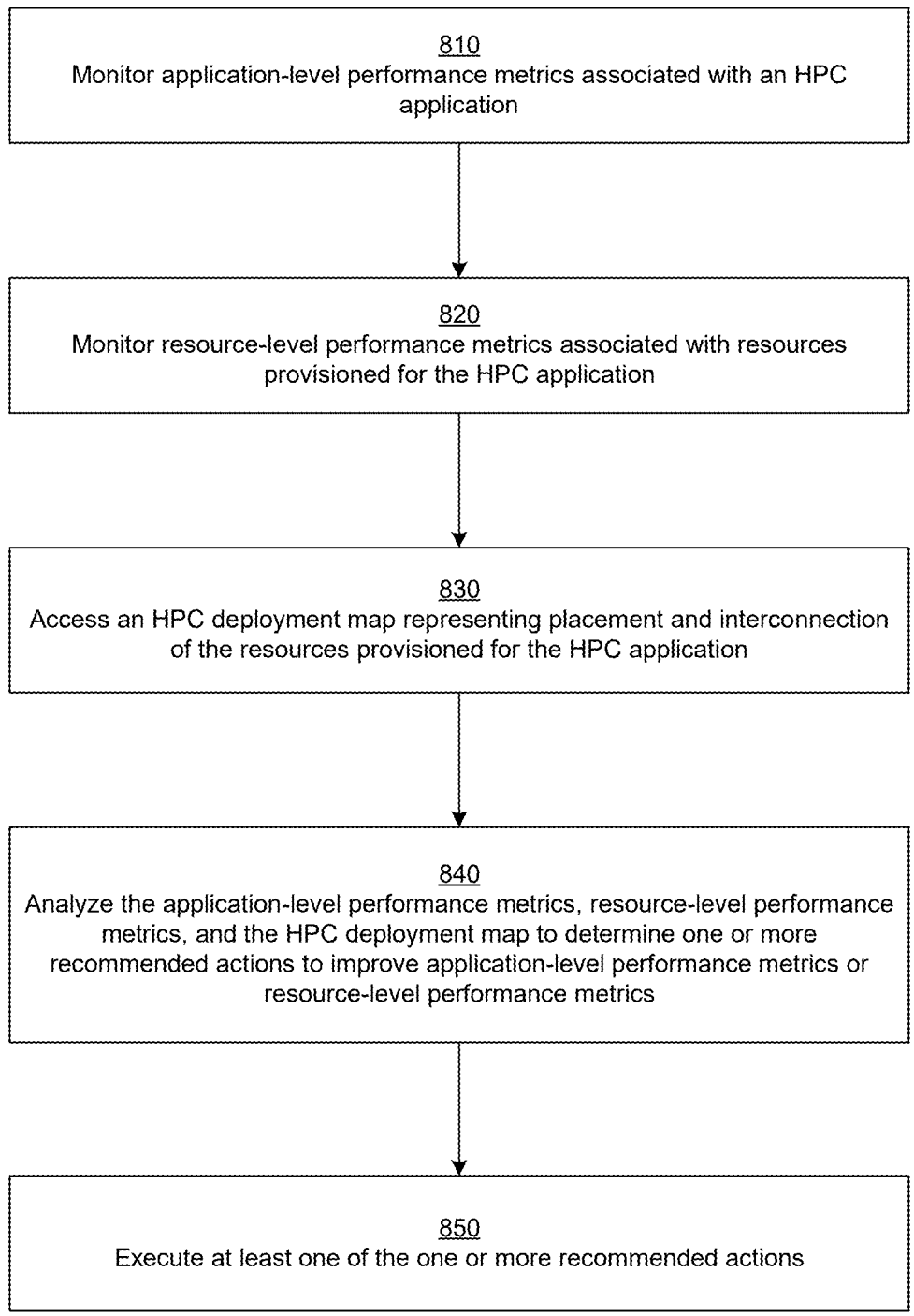
FIG. 8 is a flowchart of an example method for dynamical resource allocation for HPC applications, in accordance with one or more embodiments.

FIG. 8 is a flowchart of an example method 800 for dynamically provisioning resources for HPC applications, in accordance with one or more embodiments. The steps in the method 800 may be performed in any sequence. In some embodiments, more or fewer steps may be included in the method 800. The method 800 may be performed by a computing system, e.g., a storage system described herein with respect to FIGS. 1-7.

The storage system monitors 810 application-level performance metrics associated with an HPC application. The application-level performance metrics include (but are not limited to) client sessions, metadata IOPS, file bandwidth, file IOPS, and/or file extends. The storage system monitors 820 resource-level performance metrics associated with resources provisioned for the HPC application. The resource-level performance metrics include (but are not limited to) CPU utilization, storage capacity, and/or network utilization. The storage system access 830 an HPC deployment map representing placement and interconnection of the resources provisioned for the HPC application.

The storage system analyzes 840 the application-level performance metrics, resource-level performance metrics, and the HPC deployment map to determine one or more recommended actions to improve application-level performance metrics or resource-level performance metrics. The one or more recommended actions include (but are not limited to) modifying a type or quantity of a compute resource, modifying a type or a quantity of a storage resource, modifying a network resource, and/or modifying a geolocation of a compute resource or a storage resource.

In some embodiments, the storage system applies a trained machine learning model trained on historical performance metrics data. The trained machine learning model is configured to receive the application-level performance metrics, resource-level performance metrics, and the HPC deployment map as input to output one or more recommended actions. In some embodiments, the storage system further applies a trained machine learning model to predict performance metrics at a future time and preemptively adjusting resources based on the prediction before the future time.

The storage system executes 850 at least one of the one or more recommended actions. In some embodiments, the execution of the at least one recommended action includes identifying a first type of storage device with a first data access speed currently in use within the HPC application, and selecting a second type of storage device with a second data access speed that differs from the first data access speed based on the application-level performance metrics, resource-level performance metrics, and the HPC deployment map. An amount of the second type of storage device is then provisioned. The storage system then migrates at least a portion of the data stored on the first type of storage device to the provisioned second type of storage device, and deprovisions an amount of the first type of storage device on which the portion of the data previously stored that has been migrated to the second type of storage.

In some embodiments, the execution of the at least one recommended action includes identifying a first type of compute resource with a first processing speed currently in use within the HPC application, and selecting a second type of compute resource with a second processing speed that differs from the first data access speed based on the monitored performance metrics. An amount of the second type of compute resource is provisioned. The system replaces an amount of the first type of compute resource with the amount of the second type of compute resource, and deprovisions the amount of the first type of compute resource replaced by the second type of compute resource. In some embodiments, executing at least one of the one or more recommendations further includes adjusting a network bandwidth of the HPC application.

Example Computing System

Figure 9:
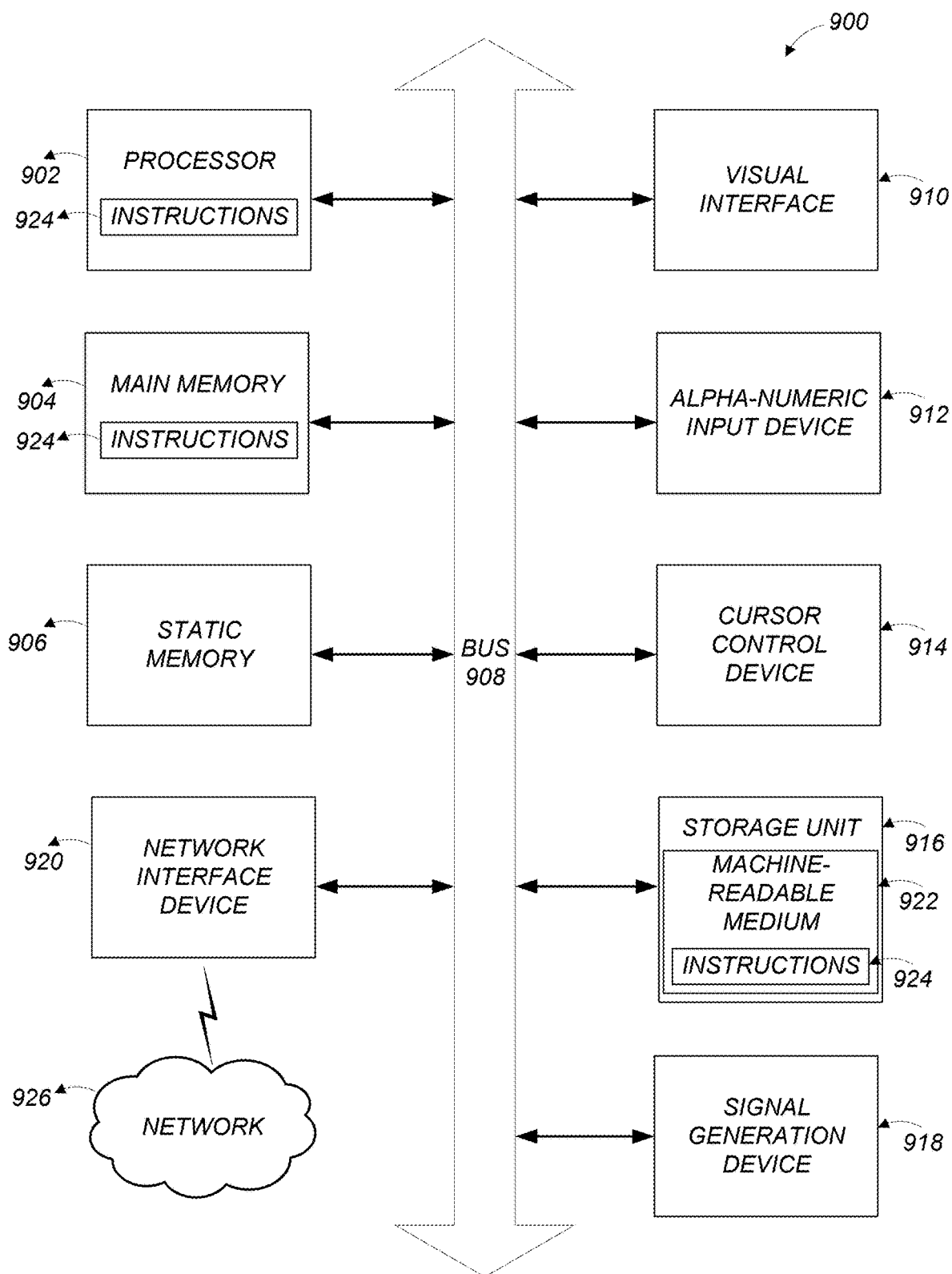
FIG. 9 is a block diagram illustrating components of an example computing system that is able to read instructions from a machine-readable medium and execute them in a processor (or controller) in accordance with one or more embodiments.

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 within which program code (e.g., software) for causing the machine to perform any one or more of the methodologies discussed herein may be executed. The program code may be comprised of instructions 924 executable by one or more processors 902. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors 902 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 904, and a static memory 906, which are configured to communicate with each other via a bus 908. The computer system 900 may further include visual display interface 910. The visual interface may include a software driver that enables (or provide) user interfaces to render on a screen either directly or indirectly. The visual interface 910 may interface with a touch enabled screen. The computer system 900 may also include input devices 912 (e.g., a keyboard a mouse), a cursor control device 914, a storage unit 916, a signal generation device 918 (e.g., a microphone and/or speaker), and a network interface device 920, which also are configured to communicate via the bus 908.

The storage unit 916 includes a machine-readable medium 922 (e.g., magnetic disk or solid-state memory) on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method, comprising:
monitoring application-level performance metrics associated with a high-performance computing (HPC) application;
monitoring resource-level performance metrics associated with resources provisioned for the HPC application;
accessing an HPC deployment map representing placement and interconnection of the resources provisioned for the HPC application;
analyzing the application-level performance metrics, resource-level performance metrics, and the HPC deployment map to determine one or more recommended actions to improve the application-level performance metrics or the resource-level performance metrics, the one or more recommended actions including one or more of modifying a type or quantity of a compute resource, modifying a type or a quantity of a storage resource, modifying a network resource, and modifying a geolocation of a compute resource or a storage resource; and executing at least one of the one or more recommended actions, comprising:
- identifying a first type of storage device with a first data access speed currently in use within the HPC application;
- selecting a second type of storage device with a second data access speed that differs from the first data access speed based on the application-level performance metrics, resource-level performance metrics, and the HPC deployment map;
- provisioning an amount of the second type of storage device;
- migrating at least a portion of the data stored on the first type of storage device to the provisioned second type of storage device; and
- deprovisioning an amount of the first type of storage device on which the portion of the data previously stored that has been migrated to the second type of storage.

2. The computer-implemented method of claim 1, wherein the application-level performance metrics include one or more of: a number of active client sessions, metadata input/output operations per second (IOPS), file IOPS, file bandwidth, or file extents associated with the HPC application.

3. The computer-implemented method of claim 1, wherein the resource-level performance metrics include one or more of: processor utilization, storage capacity, or network utilization associated with the resources provisioned for the HPC application.

4. The computer-implemented method of claim 2, wherein selecting the second type of storage device includes:
- determining a file IOPS associated with the portion of data; and
- in response to determining that the file IOPS associated with the portion of data is greater than a predetermined threshold, selecting the second type of storage device with the second data access speed greater than the first data access speed of the first type of device.

5. The computer-implemented method of claim 2, wherein selecting the second type of storage device includes:
- determining a file IOPS associated with the portion of data; and
- in response to determining that the file IOPS associated with the portion of data is lower than a predetermined threshold, selecting the second type of device with the second data access speed lower than the first data access speed of the first type of device.

6. The computer-implemented method of claim 1, executing at least one of the one or more recommendations further comprising:
- identifying a first type of compute resource with a first processing speed currently in use within the HPC application;
- selecting a second type of compute resource with a second processing speed that differs from the first data access speed based on the monitored performance metrics;
- provisioning an amount of the second type of compute resource;
- replacing an amount of the first type of compute resource with the amount of the second type of compute resource;
- deprovisioning the amount of the first type of compute resource replaced by the second type of compute resource.

7. The computer-implemented method of claim 1, executing at least one of the one or more recommendations further comprising adjusting a network bandwidth of the HPC application.

8. The computer-implemented method of claim 1, analyzing the application-level performance metrics, resource-level performance metrics, and the HPC deployment map to determine one or more recommended actions comprising:
- applying a trained machine learning model trained over historical data associated with the HPC application, the trained machine learning model is configured to receive the application-level performance metrics, resource-level performance metrics, and the HPC deployment map as input and output the one or more recommended actions.

9. The computer-implemented method of claim 1, executing at least one of the one or more recommendations by the HPC application further comprising:
- determining a region where most end-users of the HPC application are located; and
- reallocating compute resources or storage resources closer to the region to reduce latency.

10. The computer-implemented method of claim 1, wherein data in the HPC application is encoded based on an erasure coding scheme, and the method further comprises encoding the portion of the data migrated to the second type of storage device based on the erasure coding scheme.

11. A non-transitory computer readable storage medium storing instructions that when executed by one or more computer processors, cause the one or more computer processors to perform steps comprising:
- monitoring application-level performance metrics associated with a high-performance computing (HPC) application;
- monitoring resource-level performance metrics associated with resources provisioned for the HPC application;
- accessing an HPC deployment map representing placement and interconnection of the resources provisioned for the HPC application;
- analyzing the application-level performance metrics, resource-level performance metrics, and the HPC deployment map to determine one or more recommended actions to improve the application-level performance metrics or the resource-level performance metrics, the one or more recommended actions including one or more of modifying a type or quantity of a compute resource, modifying a type or a quantity of a storage resource, modifying a network resource, and modifying a geolocation of a compute resource or a storage resource; and
- executing at least one of the one or more recommended actions, comprising:
  - identifying a first type of storage device with a first data access speed currently in use within the HPC application;
  - selecting a second type of storage device with a second data access speed that differs from the first data access speed based on the application-level performance metrics, resource-level performance metrics, and the HPC deployment map;
  - provisioning an amount of the second type of storage device;

migrating at least a portion of the data stored on the first type of storage device to the provisioned second type of storage device; and deprovisioning an amount of the first type of storage device on which the portion of the data previously stored that has been migrated to the second type of storage.

12. The non-transitory computer readable storage medium of claim 11, wherein the application-level performance metrics include one or more of: a number of active client sessions, metadata input/output operations per second (IOPS), file IOPS, file bandwidth, or file extents associated with the HPC application.

13. The non-transitory computer readable storage medium of claim 11, wherein the resource-level performance metrics include one or more of: processor utilization, storage capacity, or network utilization associated with the resources provisioned for the HPC application.

14. The non-transitory computer readable storage medium of claim 12, wherein selecting the second type of storage device includes:

determining a file IOPS associated with the portion of data; and in response to determining that the file IOPS associated with the portion of data is greater than a predetermined threshold, selecting the second type of device with the second data access speed greater than the first data access speed of the first type of device.

15. The non-transitory computer readable storage medium of claim 12, wherein selecting the second type of storage device includes:

determining a file IOPS associated with the portion of data; and in response to determining that the file IOPS associated with the portion of data is lower than a predetermined threshold, selecting the second type of device with the second data access speed lower than the first data access speed of the first type of device.

16. The non-transitory computer readable storage medium of claim 11, executing at least one of the one or more recommendations further comprising:

identifying a first type of compute resource with a first processing speed currently in use within the HPC application;

selecting a second type of compute resource with a second processing speed that differs from the first data access speed based on the monitored performance metrics;

provisioning an amount of the second type of compute resource;

replacing an amount of the first type of compute resource with the amount of the second type of compute resource;

deprovisioning the amount of the first type of compute resource replaced by the second type of compute resource.

17. The non-transitory computer readable storage medium of claim 11, executing at least one of the one or more recommendations further comprising adjusting a network bandwidth of the HPC application.

18. The non-transitory computer readable storage medium of claim 11, analyzing the application-level performance metrics, resource-level performance metrics, and the HPC deployment map to determine one or more recommended actions comprising:

applying a trained machine learning model trained over historical data associated with the HPC application, the trained machine learning model is configured to receive the application-level performance metrics, resource-level performance metrics, and the HPC deployment map as input and output the one or more recommended actions.

19. The non-transitory computer readable storage medium of claim 11, executing at least one of the one or more recommendations by the HPC application further comprising:

determining a region where most end-users of the HPC application are located; and reallocating compute resources or storage resources closer to the region to reduce latency.

20. A computing system comprising:

one or more computer processors; and a non-transitory computer readable storage medium storing instructions that when executed by the one or more computer processors, cause the one or more computer processors to perform steps comprising computer-implemented method, comprising:

monitoring application-level performance metrics associated with a high-performance computing (HPC) application;

monitoring resource-level performance metrics associated with resources provisioned for the HPC application;

accessing an HPC deployment map representing placement and interconnection of the resources provisioned for the HPC application;

analyzing the application-level performance metrics, resource-level performance metrics, and the HPC deployment map to determine one or more recommended actions to improve the application-level performance metrics or the resource-level performance metrics, the one or more recommended actions including one or more of modifying a type or quantity of a compute resource, modifying a type or a quantity of a storage resource, modifying a network resource, and modifying a geolocation of a compute resource or a storage resource; and executing at least one of the one or more recommended actions, comprising:

identifying a first type of storage device with a first data access speed currently in use within the HPC application;

selecting a second type of storage device with a second data access speed that differs from the first data access speed based on the application-level performance metrics, resource-level performance metrics, and the HPC deployment map;

provisioning an amount of the second type of storage device;

migrating at least a portion of the data stored on the first type of storage device to the provisioned second type of storage device; and deprovisioning an amount of the first type of storage device on which the portion of the data previously stored that has been migrated to the second type of storage.

* * * * *